(12) United States Patent
Fujimoto

(10) Patent No.: US 9,156,445 B2
(45) Date of Patent: Oct. 13, 2015

(54) STRADDLE-TYPE VEHICLE

(71) Applicant: YAMAHA HATSUDOKI KABUSHIKI KAISHA, Iwata-shi, Shizuoka (JP)

(72) Inventor: Hiroyuki Fujimoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/514,485

(22) Filed: Oct. 15, 2014

(65) Prior Publication Data

US 2015/0197222 A1 Jul. 16, 2015

(30) Foreign Application Priority Data

Jan. 15, 2014 (JP) ................. 2014-004779

(51) Int. Cl.
| | |
|---|---|
| *B60T 7/06* | (2006.01) |
| *F16D 55/39* | (2006.01) |
| *B60K 17/34* | (2006.01) |
| *B60T 7/10* | (2006.01) |

(52) U.S. Cl.
CPC . *B60T 7/06* (2013.01); *B60K 17/34* (2013.01); *B60T 7/102* (2013.01); *F16D 55/39* (2013.01)

(58) Field of Classification Search
CPC .......... B60T 7/06; B60T 7/102; F16D 55/39; F16D 27/14; F16D 13/38; B60K 17/34; B60K 17/356
USPC ........... 188/71.5, 72.7, 72.8; 192/44, 45.004, 192/45.008, 54.52, 56.33, 56.54, 56.57, 192/215, 219.3; 180/244, 248, 250
See application file for complete search history.

(56) References Cited

U.S. PATENT DOCUMENTS

| | | | | |
|---|---|---|---|---|
| 6,401,857 | B1 | 6/2002 | Hisada et al. | |
| 6,824,487 | B2 * | 11/2004 | Williams | ........... B60K 17/3465 180/248 |
| 2002/0070067 | A1 * | 6/2002 | Kawamoto | .............. F16H 48/08 180/250 |
| 2002/0139598 | A1 * | 10/2002 | Miguchi | ................ B60K 17/26 180/244 |
| 2007/0158160 | A1 * | 7/2007 | Puiu | ........................ F16D 28/00 192/70.23 |
| 2015/0144453 | A1 * | 5/2015 | Larkin | .................... F16D 13/38 192/84.7 |

FOREIGN PATENT DOCUMENTS

JP 3011718 2/2000

* cited by examiner

*Primary Examiner* — Christopher Schwartz
(74) *Attorney, Agent, or Firm* — Keating & Bennett, LLP

(57) ABSTRACT

A straddle-type vehicle includes an input shaft connected to a rear drive shaft and extending in a front-rear direction of the vehicle, an output shaft connected to an axle and configured to rotate by receiving a driving force from the input shaft, a brake operator on which an operation is performed to brake the input shaft, a plate group disposed between a wall portion of a housing and a cam member, a cam plate disposed between the cam member and the plate group, an operation shaft extending in a direction perpendicular or substantially perpendicular to an axial direction of the input shaft, a first engagement protrusion protruding from the cam plate, a second engagement protrusion protruding from the operation shaft and engaging with the first engagement protrusion, a lever rotatable together with the operation shaft, and an operation cable connected to the brake operator and the lever.

12 Claims, 12 Drawing Sheets

STRADDLE-TYPE VEHICLE

This application claims priority to Patent Application No. 2014-4779 filed in Japan on Jan. 15, 2014, the entire contents of which are hereby incorporated by reference.

BACKGROUND OF THE INVENTION

1. Field of the Invention

The present invention relates to straddle-type vehicles.

2. Description of the Related Art

Straddle-type vehicles are conventionally known. Straddle-type vehicles are vehicles that riders straddle when getting on the vehicles. Japanese Patent No. 3011718 discloses a straddle-type vehicle in which a brake is provided inside a power transmission path between a power unit and a wheel.

The straddle-type vehicle disclosed in Japanese Patent No. 3011718 includes a drive shaft that extends in a vehicle front-rear direction and a transmission shaft that is connected to the drive shaft, disposed inside a brake case, and extends in the vehicle front-rear direction. The brake includes a plurality of rotation brake plates that rotate together with the transmission shaft, a plurality of fixed brake plates disposed so that the rotation brake plates and the fixed brake plates are located in an alternating manner, an annular pressure cam disposed between a partition wall at a front side of the brake case and the foremost fixed brake plate, and a steel ball disposed between the partition wall at the front side of the brake case and an inclined cam groove of the pressure cam. A left end portion of the pressure cam is provided with an engagement protrusion that protrudes leftward. The brake further includes a brake rotation shaft that extends in the vehicle front-rear direction at a position leftward of the transmission shaft. The brake rotation shaft passes through the brake case. An inner lever that engages with the engagement protrusion of the pressure cam is provided at a portion of the brake rotation shaft which is located inside the brake case. An outer lever is fixed to a portion of the brake rotation shaft which is located outside the brake case. The outer lever is connected with an operation cable connected to a brake lever and an operation cable connected to a brake pedal.

When the brake lever or the brake pedal is operated by a rider, the operation cable is pulled to cause the brake rotation shaft to rotate. Upon rotation of the brake rotation shaft, the inner lever presses the engagement protrusion of the pressure cam, thus rotating the pressure cam. Then, the steel ball is displaced from the inclined cam groove, and the pressure cam is pushed rearward by the steel ball. Thus, the rotation brake plates and the fixed brake plates are pressed against each other by the pressure cam. As a result, the transmission shaft is braked.

SUMMARY OF THE INVENTION

In the above-described straddle-type vehicle, the operation cables extend rightward from the outer lever. The brake lever and the brake pedal are disposed forward of the outer lever. Therefore, in order to connect the operation cables to the brake lever and the brake pedal, the operation cables extending rightward from the outer lever have to be bent forward by 90 degrees. However, when the operation cables are bent by 90 degrees, power transmission losses in the operation cables are considerable. Furthermore, an amount of rotation of the brake rotation shaft decreases with respect to an amount of operation performed on the brake lever or the brake pedal. Consequently, the above-described straddle-type vehicle is disadvantageous in that an operation performed on the brake lever or the brake pedal cannot be efficiently transmitted to the brake (more specifically, the brake plates).

Accordingly, preferred embodiments of the present invention provide a straddle-type vehicle that includes a plurality of brake plates arranged in a front-rear direction and efficiently transmits an operation performed on a brake operator to the brake plates.

A straddle-type vehicle according to a preferred embodiment of the present invention includes a power unit; a drive shaft connected to the power unit and extending in a front-rear direction of the vehicle, the drive shaft being configured to rotate by receiving a driving force from the power unit; an input shaft connected to the drive shaft and extending in the vehicle front-rear direction; a housing including a wall portion facing rearward or frontward and in which at least a portion of the input shaft is housed; an output shaft connected to an axle and extending in a right-left direction of the vehicle, the output shaft being configured to rotate by receiving a driving force from the input shaft; a brake operator configured to have an operation performed thereon to brake the input shaft; a cam member disposed inside the housing and spaced away from the wall portion of the housing in the vehicle front-rear direction; a plate group disposed between the wall portion of the housing and the cam member, the plate group including annular rotation plates attached to the input shaft so as to be rotated together with the input shaft, and annular fixed plates each disposed between an adjacent one of the rotation plates and the cam member and/or between an adjacent one of the rotation plates and the wall portion of the housing; and an annular cam plate disposed between the cam member and the plate group. The cam member and/or the cam plate are/is provided with a cam groove including an inclined surface. The straddle-type vehicle further includes a cam ball located between the cam member and the cam plate and disposed inside the cam groove; a rotatable operation shaft passing through the housing and extending in a direction perpendicular or substantially perpendicular to an axial direction of the input shaft, the operation shaft including an inner portion located inside the housing and an outer portion located outside the housing; a first engagement protrusion disposed inside the housing and protruding outward from the cam plate in a radial direction of the cam plate; a second engagement protrusion protruding outward from the inner portion of the operation shaft in a radial direction of the operation shaft, and engaging with the first engagement protrusion; a lever attached to the outer portion of the operation shaft and rotatable together with the operation shaft; and an operation cable connected to the brake operator and the lever.

In the straddle-type vehicle according to a preferred embodiment of the present invention, the operation shaft extends in the direction perpendicular or substantially perpendicular to the axial direction of the input shaft which extends in the vehicle front-rear direction. Therefore, the lever attached to the outer portion of the operation shaft rotates around an axis perpendicular or substantially perpendicular to the axial direction of the input shaft. Thus, the operation cable connected to the brake operator and to the lever extends from the lever in a direction parallel or substantially parallel to the axial direction of the input shaft. In other words, the operation cable extends from the lever in the vehicle front-rear direction. Hence, the operation cable does not have to be bent by 90 degrees when the brake operator and the lever are connected to each other through the operation cable. As a result, a power transmission loss in the operation cable is significantly reduced or prevented, thus efficiently transmitting an operation performed on the brake operator.

According to another preferred embodiment of the present invention, the brake operator is preferably disposed frontward relative to the housing, and the operation cable preferably extends frontward from the lever.

According to the above-described preferred embodiment, the operation cable does not have to be bent by 90 degrees when the brake operator and the lever are connected to each other through the operation cable. As a result, a power transmission loss in the operation cable is significantly reduced or prevented, thus efficiently transmitting an operation performed on the brake operator.

According to still another preferred embodiment of the present invention, the first engagement protrusion preferably includes a first contact portion configured to come into contact with the second engagement protrusion. The second engagement protrusion preferably includes a second contact portion configured to come into contact with the first contact portion of the first engagement protrusion. An outline of a cross-section of at least either the first contact portion or the second contact portion which is parallel or substantially parallel to an axial direction of the operation shaft is preferably in the shape of a segment of a circle. An outline of a cross-section of at least either the first contact portion or the second contact portion which is perpendicular or substantially perpendicular to the axial direction of the operation shaft is preferably in the shape of a segment of a circle.

According to the above-described preferred embodiment, when the operation shaft is rotated by operating the brake operator, the first and second engagement protrusions are brought into contact with each other more reliably. As a result, an operation performed on the brake operator is reliably transmitted to the plate group. Furthermore, wearing away of the first and second engagement protrusions which is caused by contact therebetween is reduced.

According to yet another preferred embodiment of the present invention, the first engagement protrusion preferably includes a first contact portion configured to come into contact with the second engagement protrusion. The second engagement protrusion preferably includes a second contact portion configured to come into contact with the first contact portion of the first engagement protrusion. An outline of a cross-section of the first contact portion which is parallel or substantially parallel to an axial direction of the operation shaft preferably has a linear shape, and an outline of a cross-section of the first contact portion which is perpendicular or substantially perpendicular to the axial direction of the operation shaft preferably has a linear shape. An outline of a cross-section of the second contact portion which is parallel or substantially parallel to the axial direction of the operation shaft is preferably in the shape of a segment of a circle, and an outline of a cross-section of the second contact portion which is perpendicular or substantially perpendicular to the axial direction of the operation shaft is preferably in the shape of a segment of a circle.

According to the above-described preferred embodiment, when the operation shaft is rotated by operating the brake operator, the first and second engagement protrusions are brought into contact with each other more reliably. As a result, an operation performed on the brake operator is reliably transmitted to the plate group. Furthermore, wearing away of the first and second engagement protrusions which is caused by contact therebetween is reduced.

According to still yet another preferred embodiment of the present invention, the lever is preferably disposed rightward relative to a left end of the housing and leftward relative to a right end of the housing.

According to the above-described preferred embodiment, the lever does not protrude outward of the housing in a vehicle width direction. As a result, compactness of the housing, in which the lever is included, in the vehicle width direction is ensured.

According to another preferred embodiment of the present invention, the housing preferably includes a housing main body supporting the input shaft; and a housing cover attached to the housing main body. The operation shaft is preferably rotatably supported by the housing main body and the housing cover.

In the above-described preferred embodiment, end portions of the operation shaft are supported by the housing main body and the housing cover. As a result, the operation shaft is reliably supported, thus efficiently transmitting an operation performed on the brake operator to the plate group.

According to still another preferred embodiment of the present invention, the cam plate is preferably disposed rearward relative to the plate group.

When the cam plate is disposed frontward relative to the plate group, a structure configured to support the operation shaft is provided so that one of the end portions of the operation shaft is supported. In such a case, if an attempt is made to support both of the end portions of the operation shaft, an additional component is necessary, thus complicating the structure that supports the operation shaft. However, when the cam plate is disposed rearward relative to the plate group as in the above-described preferred embodiment, no additional component is necessary, and therefore, the end portions of the operation shaft are supported with a simple structure.

According to yet another preferred embodiment of the present invention, the second engagement protrusion preferably protrudes frontward from the operation shaft.

According to the above-described preferred embodiment, the first and second engagement protrusions are disposed close to the plate group. Therefore, oil scattered from the plate group is easily supplied to the first and second engagement protrusions. As a result, the first and second engagement protrusions are lubricated.

According to still yet another preferred embodiment of the present invention, the straddle-type vehicle preferably further includes a first bearing rotatably supporting the input shaft, and a second bearing disposed behind the first bearing and rotatably supporting the input shaft. A front end of the second engagement protrusion is preferably located frontward relative to a rear end of the first bearing. A rear end of the operation shaft is preferably located rearward relative to a front end of the second bearing.

According to the above-described preferred embodiment, the operation shaft and the second engagement protrusion are disposed in a space located laterally of the first and second bearings. As a result, the space inside the housing is effectively utilized, so that the operation shaft and the second engagement protrusion are compactly arranged.

According to another preferred embodiment of the present invention, when either one of a right end and a left end of the housing is defined as a first end and the other one of the right end and the left end of the housing is defined as a second end, a laterally intermediate portion of the output shaft is preferably located closer to the first end than a shaft center of the input shaft, and the operation shaft is preferably located closer to the first end than the shaft center of the input shaft.

According to the above-described preferred embodiment, a size of the housing in the vehicle width direction is smaller than when the operation shaft is disposed closer to the second end than the shaft center of the input shaft.

According to still another preferred embodiment of the present invention, the straddle-type vehicle preferably further includes an intermediate shaft disposed rearward relative to the input shaft and frontward relative to the output shaft, the intermediate shaft extending in the vehicle right-left direction and connected to the input shaft and to the output shaft. A left end of the operation shaft is preferably located leftward relative to a right end of the intermediate shaft and leftward relative to a right end of the output shaft. A right end of the operation shaft is preferably located rightward relative to a left end of the intermediate shaft and rightward relative to a left end of the output shaft.

According to the above-described preferred embodiment, the operation shaft, the output shaft, and the intermediate shaft are disposed so as to overlap with each other along the vehicle right-left direction. As a result, the size of the housing in the vehicle width direction is smaller than when the operation shaft, the output shaft, and the intermediate shaft are disposed at positions deviated from each other in the vehicle right-left direction.

According to yet another preferred embodiment of the present invention, the left end of the intermediate shaft is preferably located rightward relative to the left end of the operation shaft, and the right end of the intermediate shaft is preferably located leftward relative to the shaft center of the input shaft.

According to the above-described preferred embodiment, the intermediate shaft is compactly arranged inside the housing in the vehicle width direction. As a result, compactness of the housing, in which the intermediate shaft is included, in the vehicle width direction is ensured.

Various preferred embodiments of the present invention provide a straddle-type vehicle that includes a plurality of brake plates arranged in a front-rear direction and efficiently transmits an operation performed on a brake operator to the brake plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
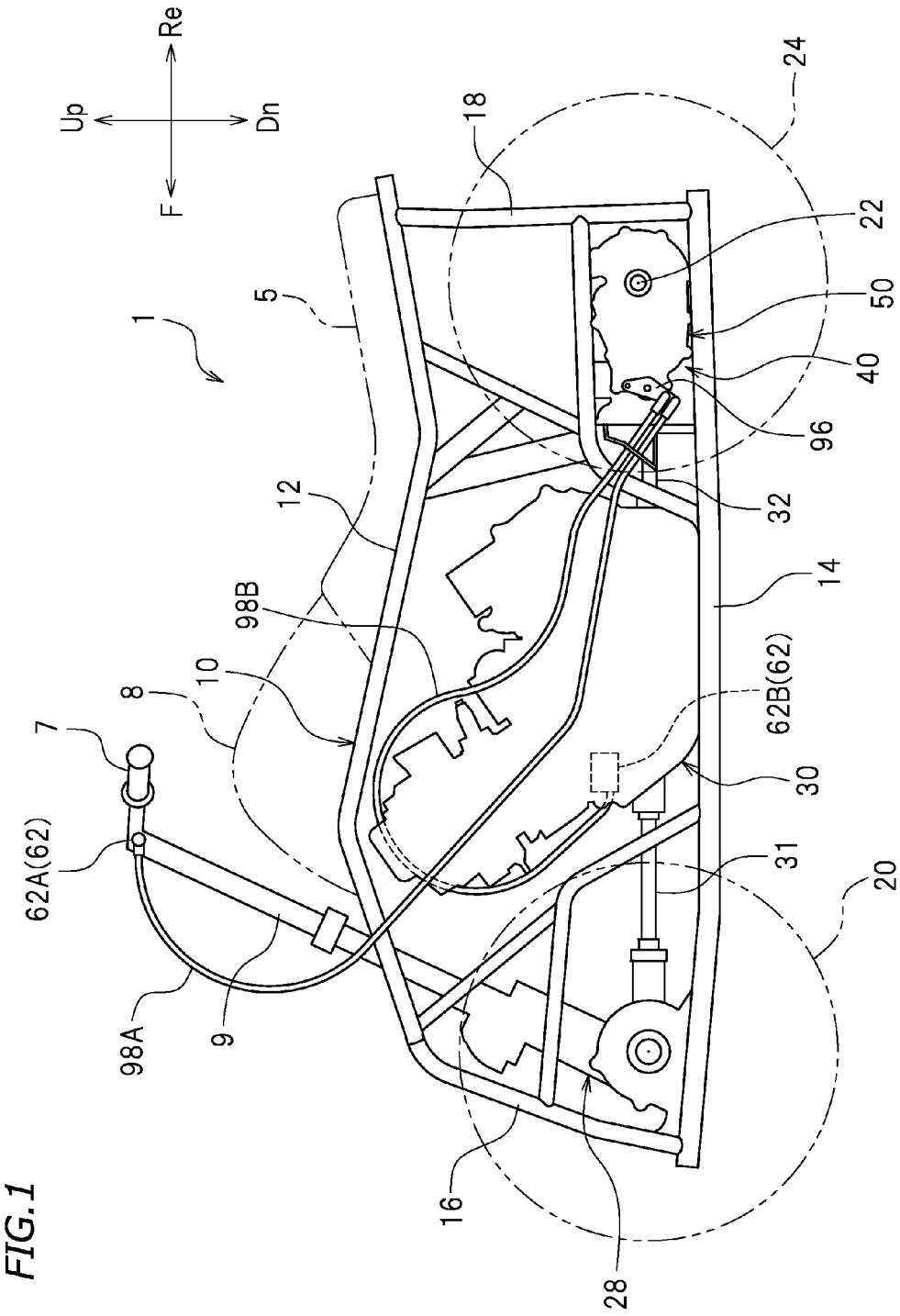
FIG. 1 is a left side view illustrating a straddle-type vehicle according to a preferred embodiment of the present invention.

Hereinafter, preferred embodiments of the present invention will be described. As illustrated in FIG. 1, a preferred embodiment of the present invention is a straddle-type vehicle 1. The straddle-type vehicle may be a motor tricycle or a four-wheeled buggy, for example.

In the following description, unless otherwise noted, the terms "front", "rear", "right", "left", "up" and "down" refer to front, rear, right, left, up and down with respect to a rider sitting on a seat 5 of the straddle-type vehicle 1, respectively. "Up" and "down" correspond to a vertically upward direction and a vertically downward direction when the straddle-type vehicle 1 is brought to a stop on a horizontal plane, respectively. Reference signs "F", "Re", "R", "L", "Up" and "Dn" in the drawings represent front, rear, right, left, up and down, respectively.

As illustrated in FIG. 1, the straddle-type vehicle 1 preferably includes a body frame 10 that extends in a front-rear direction of the vehicle. The body frame 10 preferably includes an upper main frame 12 that extends in the vehicle front-rear direction; a lower main frame 14 that extends in the vehicle front-rear direction; a front down frame 16 that extends downward from a front portion of the upper main frame 12; and a rear down frame 18 that extends downward from a rear portion of the upper main frame 12. The lower main frame 14 is located below the upper main frame 12. The front portion of the upper main frame 12 and a front portion of the lower main frame 14 are connected to each other through the front down frame 16. The rear portion of the upper main frame 12 and a rear portion of the lower main frame 14 are connected to each other through the rear down frame 18.

Figure 2:
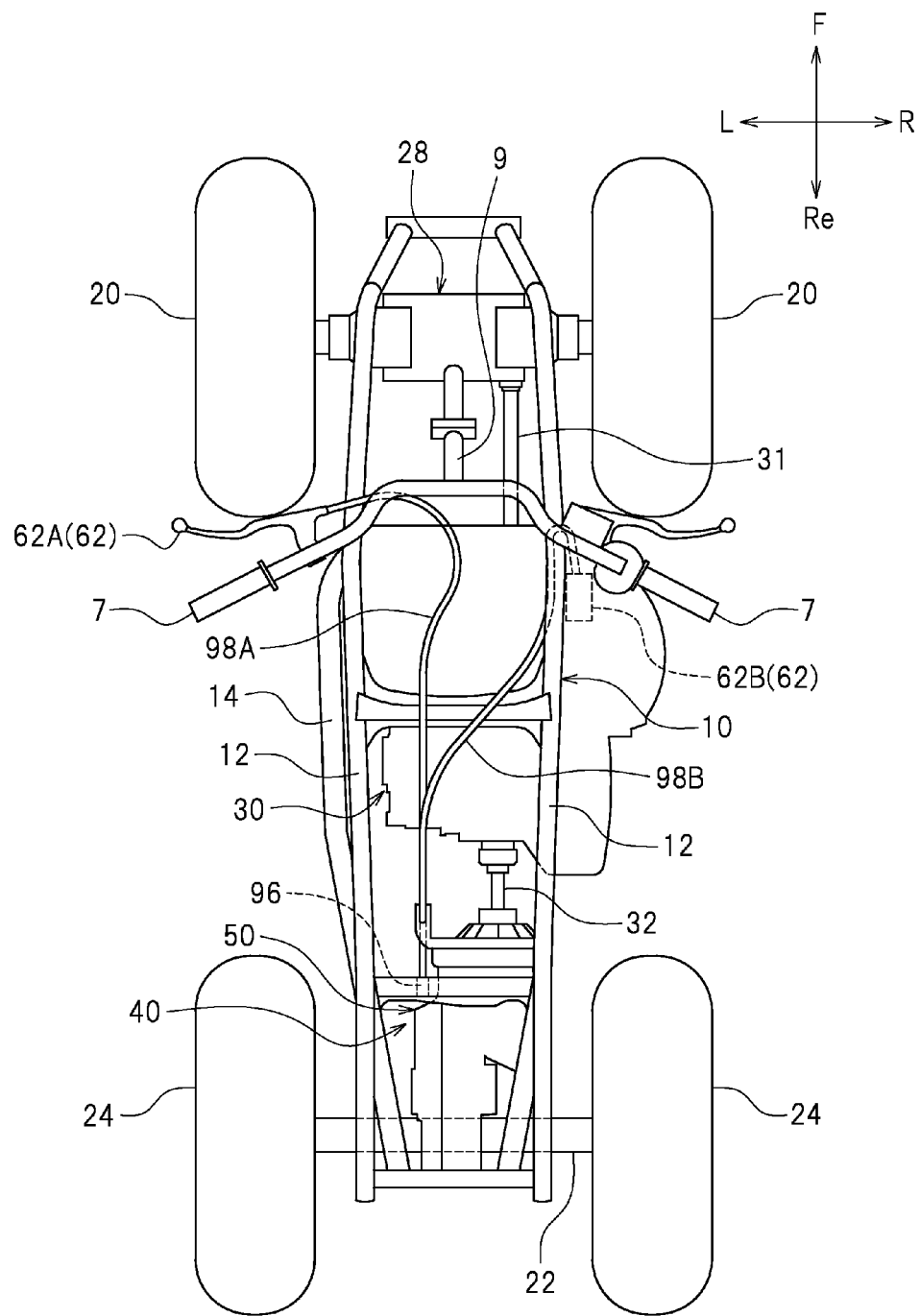
FIG. 2 is a plan view illustrating the straddle-type vehicle according to a preferred embodiment of the present invention.

A steering shaft 9 is attached to the body frame 10. A handlebar 7 is fixed to an upper portion of the steering shaft 9. A lower portion of the steering shaft 9 is connected to a front wheel suspension system 28. As illustrated in FIG. 2, right and left front wheels 20 are fixed to the front wheel suspension system 28. The front wheel suspension system 28 is preferably a double wishbone type suspension, for example. The right and left front wheels 20 are steered by the handlebar 7.

As illustrated in FIG. 1, a fuel tank 8 is disposed behind the steering shaft 9. The seat 5 on which a rider sits is disposed behind the fuel tank 8. The seat 5 is supported by the upper main frame 12. The seat 5 is disposed on or above the upper main frame 12. A power unit 30 is disposed below the fuel tank 8. The power unit 30 preferably includes an internal combustion engine, a clutch, and a transmission which are not illustrated. The power unit 30 is disposed below the upper main frame 12. The power unit 30 is disposed on or above the lower main frame 14. A front drive shaft 31 is disposed in front of the power unit 30. The front drive shaft 31 rotates by receiving a driving force from the power unit 30. The front drive shaft 31 extends in the vehicle front-rear direction. The front drive shaft 31 is connected to the front wheel suspension system 28. A rear drive shaft 32 is disposed behind the power unit 30. The rear drive shaft 32 rotates by receiving a driving force from the power unit 30. The rear drive shaft 32 extends in the vehicle front-rear direction. The rear drive shaft 32 is connected to an input shaft 42 (see FIG. 4) which will be described below.

Figure 3:
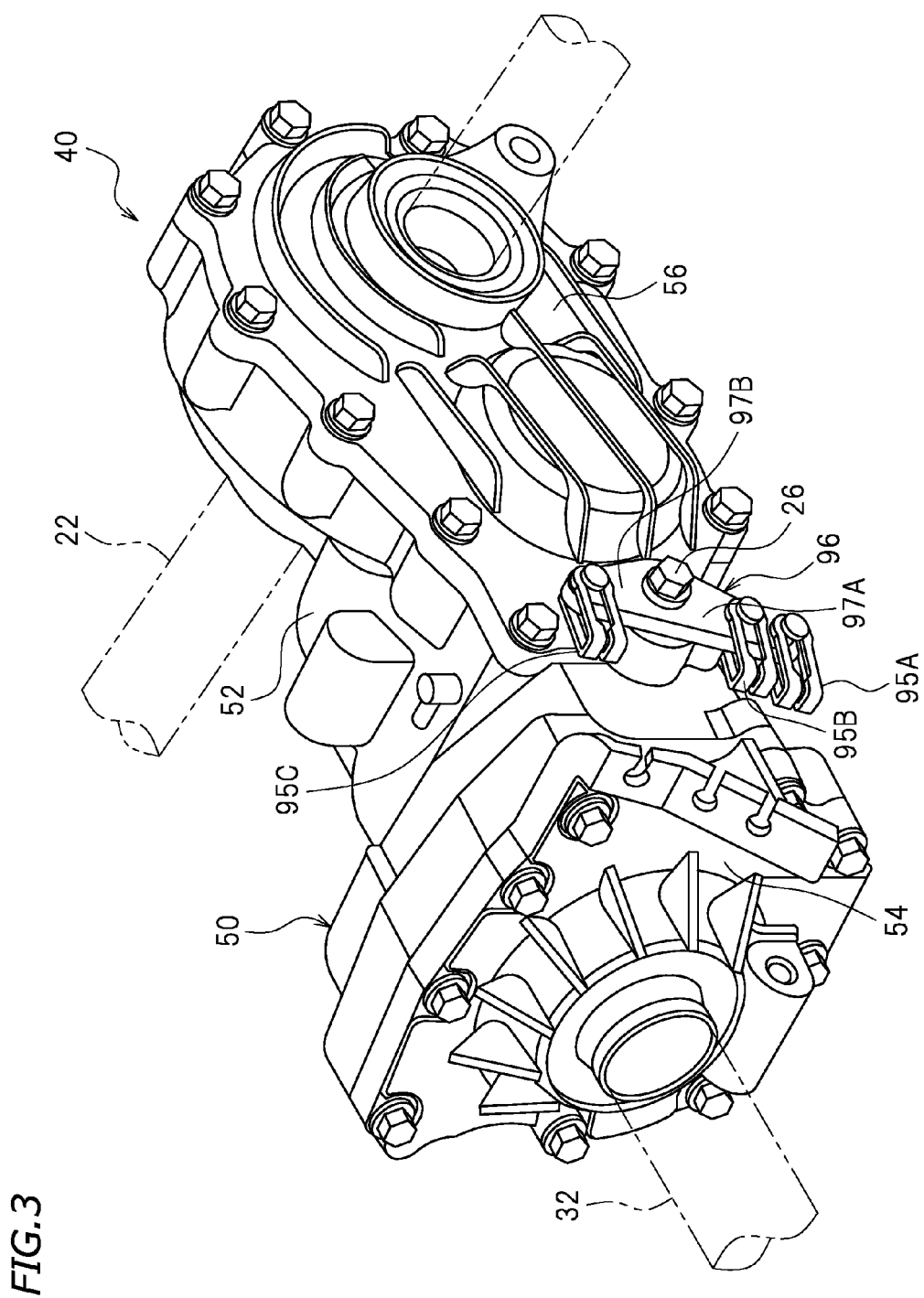
FIG. 3 is a perspective view illustrating an axle driving apparatus according to a preferred embodiment of the present invention.

The straddle-type vehicle 1 preferably includes an axle driving apparatus 40. The axle driving apparatus 40 is disposed behind the rear drive shaft 32. As illustrated in FIG. 3, an axle 22 is rotatably supported at a rear end portion of the axle driving apparatus 40. The axle 22 extends in a right-left direction of the vehicle. As illustrated in FIG. 2, right and left rear wheels 24 are supported at ends of the axle 22.

Figure 4:
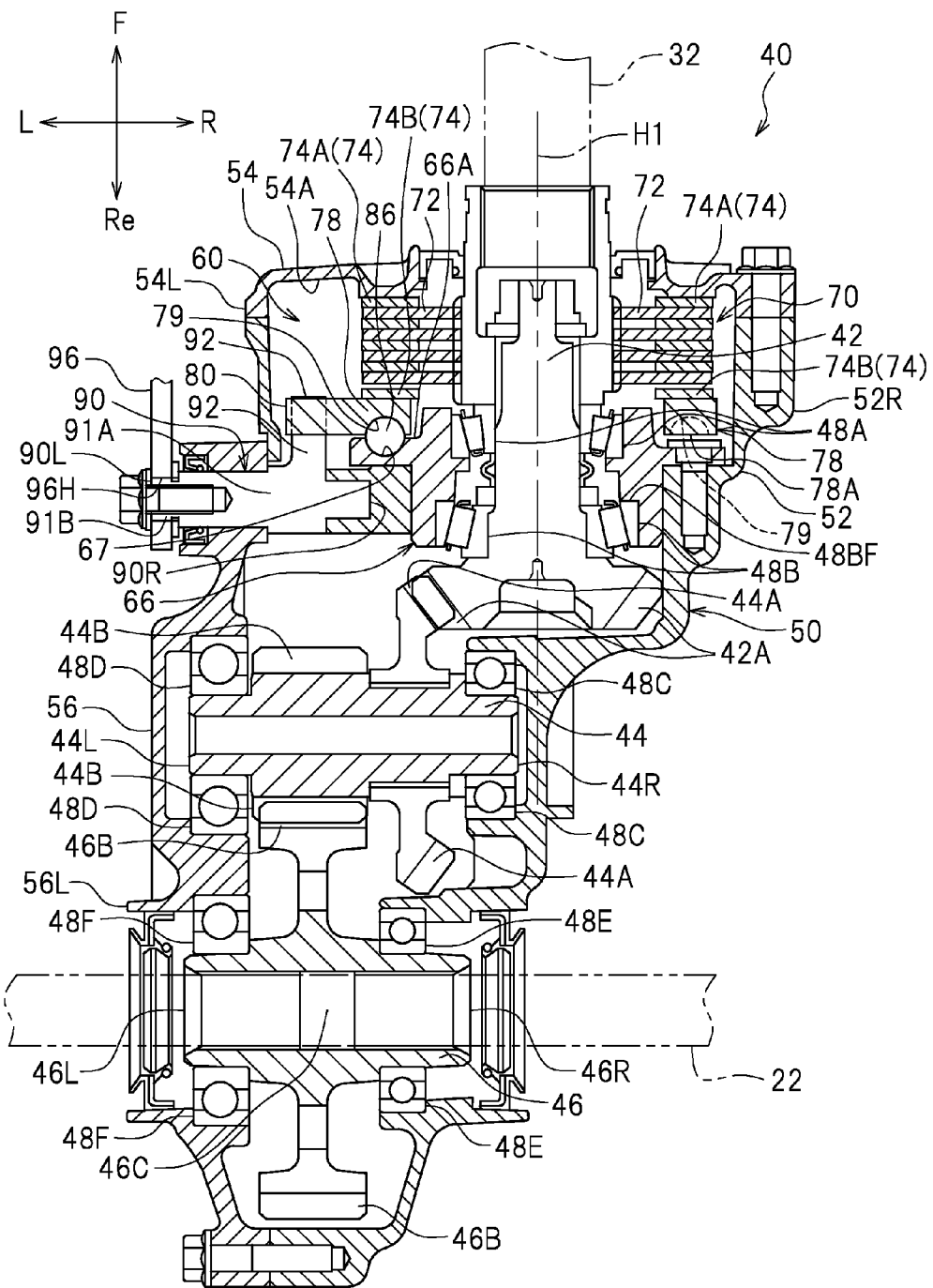
FIG. 4 is a cross-sectional view illustrating the axle driving apparatus according to a preferred embodiment of the present invention.

As illustrated in FIG. 4, the axle driving apparatus 40 preferably includes the input shaft 42, an intermediate shaft 44, an output shaft 46, and a housing 50. The housing 50 preferably includes a housing main body 52, a first housing cover 54, and a second housing cover 56. The first housing cover 54 is attached to a front portion of the housing main body 52. The second housing cover 56 is attached to a lateral portion of the housing main body 52. The second housing cover 56 is disposed leftward of the housing main body 52. The first housing cover 54 preferably includes a wall portion 54A facing rearward.

The input shaft 42 is connected to the rear drive shaft 32. The input shaft 42 rotates by receiving a driving force from the rear drive shaft 32. The input shaft 42 extends in the vehicle front-rear direction. The input shaft 42 is located behind the rear drive shaft 32. The input shaft 42 is housed inside the housing 50. The input shaft 42 is rotatably supported by the housing main body 52. At least a portion of the input shaft 42 may be disposed outside the housing 50. A bevel gear 42A is provided at a rear portion of the input shaft 42.

The intermediate shaft 44 extends in the vehicle right-left direction. The intermediate shaft 44 is disposed behind the input shaft 42. The intermediate shaft 44 is housed inside the housing 50. A left end 44L of the intermediate shaft 44 is located rightward relative to a left end 90L of an operation shaft 90 which will be described below. A right end 44R of the intermediate shaft 44 is located leftward relative to a shaft center H1 of the input shaft 42. The intermediate shaft 44 is provided with a bevel gear 44A. The bevel gear 44A intermeshes with the bevel gear 42A of the input shaft 42. Therefore, the input shaft 42 is connected to the intermediate shaft 44 via the bevel gears 42A and 44A. The intermediate shaft 44 rotates by receiving a driving force from the input shaft 42. The intermediate shaft 44 is further provided with a gear 44B. The gear 44B is located leftward of the bevel gear 44A.

The output shaft 46 extends in the vehicle right-left direction. The output shaft 46 is disposed behind the intermediate shaft 44. The output shaft 46 is housed inside the housing 50. A laterally intermediate portion 46C of the output shaft 46 is located leftward relative to the shaft center H1 of the input shaft 42. A right end 46R of the output shaft 46 is located leftward relative to the right end 44R of the intermediate shaft 44. A left end 46L of the output shaft 46 is located leftward relative to the left end 44L of the intermediate shaft 44. The output shaft 46 is provided with a gear 46B. The gear 46B intermeshes with the gear 44B of the intermediate shaft 44. Therefore, the output shaft 46 is connected to the intermediate shaft 44 via the gears 44B and 46B. The output shaft 46 rotates by receiving a driving force from the intermediate shaft 44. In other words, the output shaft 46 rotates by receiving a driving force from the input shaft 42. The axle 22 is inserted through the output shaft 46. The output shaft 46 and the axle 22 are fixed to each other so as to be rotated together. In other words, the axle 22 rotates by receiving a driving force from the rear drive shaft 32. The output shaft 46 and the axle 22 are preferably molded in one piece. In the present preferred embodiment, the output shaft 46 is connected to the input shaft 42 via the intermediate shaft 44, and therefore, the gears 42A, 44A, 44B and 46B are reduced in gear diameter even when a large speed reduction ratio is required.

A first bearing 48A, a second bearing 48B, a third bearing 48C, a fourth bearing 48D, a fifth bearing 48E, and a sixth bearing 48F are disposed in the housing 50. The first and second bearings 48A and 48B rotatably support the input shaft 42. The third and fourth bearings 48C and 48D rotatably support the intermediate shaft 44. The fifth and sixth bearings 48E and 48F rotatably support the output shaft 46. In the present preferred embodiment, the first and second bearings 48A and 48B are preferably tapered roller bearings, for example. The third, fourth, fifth and sixth bearings 48C, 48D, 48E and 48F are preferably ball bearings, for example. Note that the types of the first to sixth bearings 48A to 48F are not limited to the types mentioned above. The second bearing 48B is disposed behind the first bearing 48A. The first and second bearings 48A and 48B are fixed to a cam member 66 which will be described below. The third and fourth bearings 48C and 48D are disposed rearward relative to the second bearing 48B. The third bearing 48C is fixed to the housing main body 52. The fourth bearing 48D is fixed to the second housing cover 56. The fifth and sixth bearings 48E and 48F are disposed rearward relative to the third and fourth bearings 48C and 48D. The fifth bearing 48E is fixed to the housing main body 52. The sixth bearing 48F is fixed to the second housing cover 56.

The straddle-type vehicle 1 preferably includes a brake mechanism 60 that brakes rotation of the input shaft 42. A portion of the brake mechanism 60 is disposed inside the axle driving apparatus 40. The brake mechanism 60 preferably includes a brake operator 62 (see FIG. 1), the cam member 66, a plate group 70, a cam plate 78, cam balls 86, the operation shaft 90, a lever 96, and operation cables 98A and 98B (see FIG. 1).

As illustrated in FIG. 1, the brake operator 62 preferably includes a brake lever 62A provided at the handlebar 7, and a brake pedal 62B provided at a footrest (not illustrated) of the straddle-type vehicle 1. The rider operates the brake operator 62, thus braking rotation of the input shaft 42. The brake lever 62A and the lever 96 are connected to each other through the operation cable 98A. The brake pedal 62B and the lever 96 are connected to each other through the operation cable 98B. The brake lever 62A is disposed frontward relative to the housing 50. The brake pedal 62B is disposed frontward relative to the housing 50. The brake operator 62 may include either the brake lever 62A or the brake pedal 62B.

As illustrated in FIG. 4, the plate group 70 is housed inside the housing 50. The plate group 70 is disposed between the wall portion 54A of the first housing cover 54 and the cam member 66. The plate group 70 preferably includes a plurality of annular rotation plates 72 and a plurality of annular fixed plates 74. The rotation plates 72 and the fixed plates 74 are preferably arranged in the vehicle front-rear direction. The rotation plates 72 and the fixed plates 74 are brake plates.

The input shaft 42 is disposed radially inward of the rotation plates 72. The rotation plates 72 are attached to the input shaft 42. The rotation plates 72 rotate together with the input shaft 42. The rotation plates 72 are disposed between the wall portion 54A of the first housing cover 54 and the cam member 66.

The input shaft 42 is disposed radially inward of the fixed plates 74. The fixed plates 74 are fixed to the housing 50. The fixed plates 74 do not rotate together with the input shaft 42. Each fixed plate 74 is disposed between an adjacent one of the rotation plates 72 and the cam member 66, and/or between an adjacent one of the rotation plates 72 and the wall portion 54A of the first housing cover 54. The fixed plates 74 and the rotation plates 72 are disposed in an alternating manner. One of the plurality of fixed plates 74, i.e., a fixed plate 74A, is in contact with the wall portion 54A of the first housing cover 54. Another one of the plurality of fixed plates 74, i.e., a fixed plate 74B, is in contact with the cam plate 78.

Figure 5:
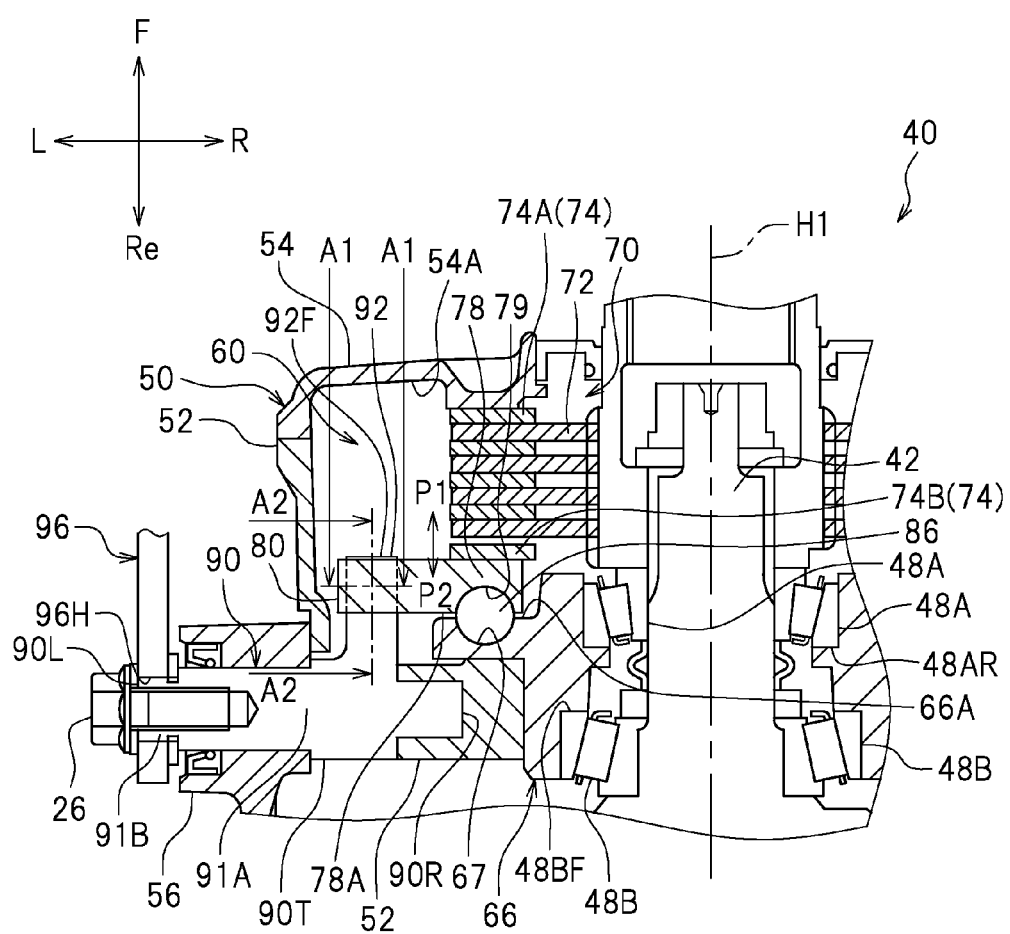
FIG. 5 is an enlarged cross-sectional view partially illustrating the axle driving apparatus according to a preferred embodiment of the present invention.

The cam member 66 is disposed inside the housing 50. The cam member 66 is disposed at a position located rearwardly away from the wall portion 54A of the first housing cover 54. The cam member 66 is disposed rearward relative to the plate group 70. The cam member 66 is disposed behind the cam plate 78. The cam member 66 preferably has an annular shape. The input shaft 42 is disposed radially inward of the cam member 66. The first and second bearings 48A and 48B, which rotatably support the input shaft 42, are disposed radially inward of the cam member 66. As illustrated in FIG. 5, a surface 66A of the cam member 66 which faces the cam plate 78 is provided with a plurality of cam grooves 67. The cam grooves 67 are preferably provided at regular intervals along a circumferential direction of the cam member 66. A portion of each cam ball 86 is disposed inside the associated cam groove 67.

Figure 6:
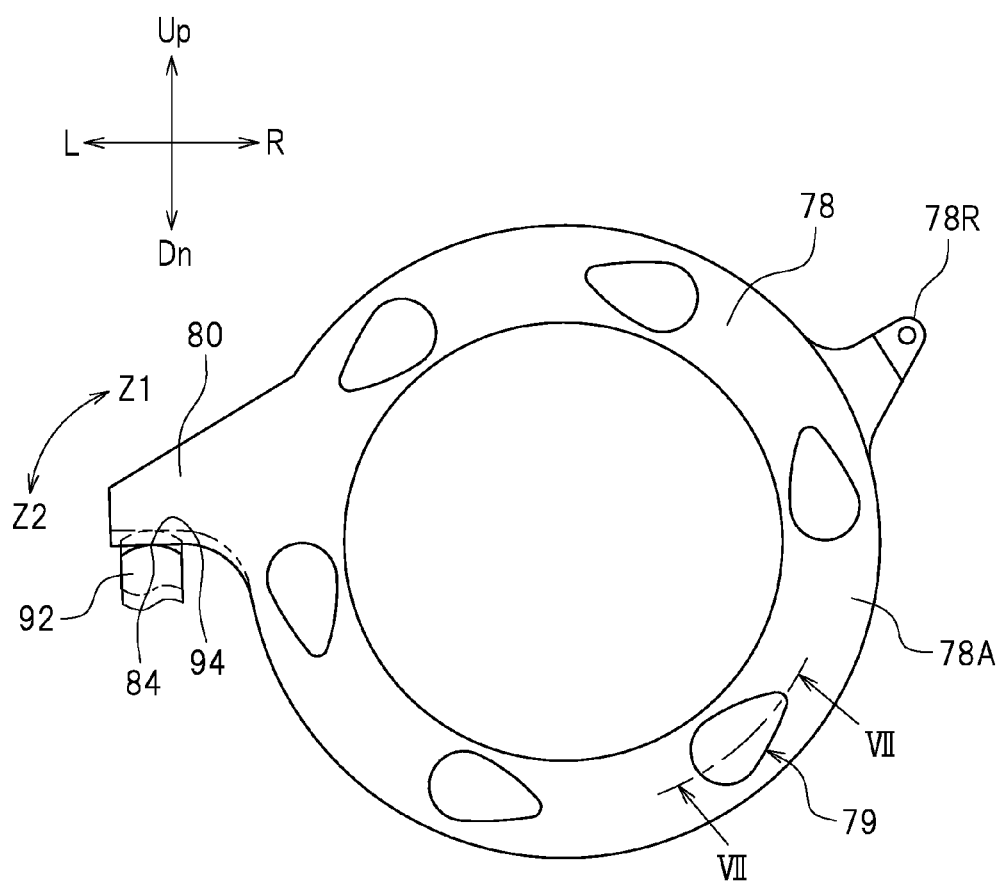
FIG. 6 is a front view illustrating a cam plate according to a preferred embodiment of the present invention.
Figure 7:
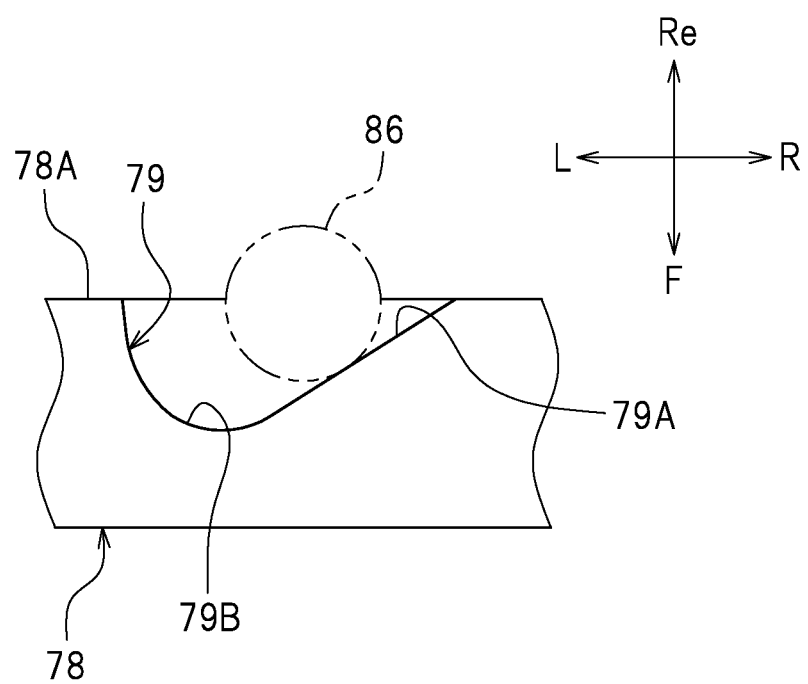
FIG. 7 is a cross-sectional view taken along the line VII-VII of FIG. 6.

As illustrated in FIG. 4, the cam plate 78 is housed inside the housing 50. The cam plate 78 is disposed rearward relative to the plate group 70. The cam plate 78 is disposed frontward relative to the cam member 66. The cam plate 78 preferably has an annular shape. As illustrated in FIG. 5, a surface 78A of the cam plate 78 which faces the cam member 66 is provided with a plurality of cam grooves 79. As illustrated in FIG. 6, the cam grooves 79 are provided at regular intervals along a circumferential direction of the cam plate 78. Each cam groove 79 faces the associated cam groove 67 of the cam member 66. As illustrated in FIG. 7, each cam groove 79 preferably includes an inclined surface 79A and a recessed portion 79B. A portion of each cam ball 86 is disposed inside the associated cam groove 79. As illustrated in FIG. 5, each cam ball 86 is located between the cam member 66 and the cam plate 78 and disposed inside the associated cam grooves 67 and 79. When the brake operator 62 (see FIG. 1) is not operated by the rider, each cam ball 86 fits into the recessed portion 79B (see FIG. 7) of the associated cam groove 79. In this case, a distance between the cam plate 78 and the cam member 66 is significantly reduced or minimized. The rotation plates 72 and the fixed plates 74 are spaced away from each other, and therefore, the input shaft 42 is rotatable. When the brake operator 62 is operated by the rider, each cam ball 86 is located on the inclined surface 79A (see FIG. 7) of the associated cam groove 79. As indicated by an arrow P1 in FIG. 5, the cam plate 78 is pushed by the cam balls 86 and moved in a direction away from the cam member 66. As a result, the rotation plates 72 and the fixed plates 74 are brought into contact with each other, thus braking the input shaft 42. In the present preferred embodiment, each cam groove 79 is provided with the inclined surface 79A while each cam groove 67 is provided with no inclined surface, but the present invention is not limited to such a structure. Alternatively, the cam grooves 67 may be provided with inclined surfaces, and the cam grooves 79 may be provided with no inclined surfaces. In another alternative, both of the cam grooves 67 and the cam grooves 79 may be provided with inclined surfaces. As illustrated in FIG. 6, the cam plate 78 is provided with an arm portion 78R that protrudes outward from the cam plate 78 in a radial direction of the cam plate 78. The arm portion 78R is provided with a coil spring (not illustrated) that urges the cam plate 78 in a direction away from the plate group 70.

As illustrated in FIG. 4, the operation shaft 90 passes through the housing 50. The operation shaft 90 extends in a direction perpendicular or substantially perpendicular to an axial direction of the input shaft 42. In other words, the operation shaft 90 extends in the vehicle right-left direction perpendicular or substantially perpendicular to the axial direction of the input shaft 42. The operation shaft 90 may extend in a vehicle vertical direction perpendicular or substantially perpendicular to the axial direction of the input shaft 42. The operation shaft 90 is rotatable. The operation shaft 90 extends in a direction parallel or substantially parallel to an axial direction of the intermediate shaft 44. The operation shaft 90 extends in a direction parallel or substantially parallel to an axial direction of the output shaft 46. The operation shaft 90 preferably includes an inner portion 91A located inside the housing 50, and an outer portion 91B located outside the housing 50. A left end portion of the operation shaft 90 is rotatably supported by the second housing cover 56. A right end portion of the operation shaft 90 is rotatably supported by the housing main body 52. The operation shaft 90 is located leftward relative to the shaft center H1 of the input shaft 42. The left end 90L of the operation shaft 90 is located leftward relative to the right end 44R of the intermediate shaft 44. The left end 90L of the operation shaft 90 is located leftward relative to the right end 46R of the output shaft 46. A right end 90R of the operation shaft 90 is located rightward relative to the left end 44L of the intermediate shaft 44. The right end 90R of the operation shaft 90 is located rightward relative to the left end 46L of the output shaft 46. As illustrated in FIG. 5, a rear end 90T of the operation shaft 90 is located rearward relative to a front end 48BF of the second bearing 48B.

The brake mechanism 60 preferably includes a first engagement protrusion 80. The first engagement protrusion 80 is disposed inside the housing 50. As illustrated in FIG. 6, the first engagement protrusion 80 protrudes outward from the cam plate 78 in a radial direction of the cam plate 78. The first engagement protrusion 80 protrudes leftward from the cam plate 78. The first engagement protrusion 80 and the cam plate 78 are preferably molded in one piece so as to define a single unitary member. Alternatively, the first engagement protrusion 80 and the cam plate 78 may be separate components.

Figure 8A:
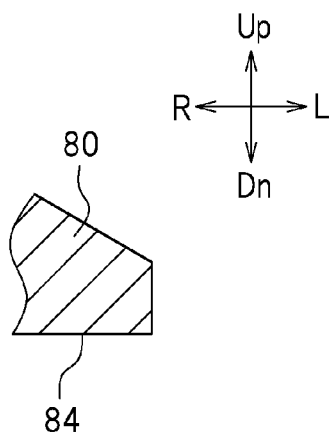
FIG. 8A is a cross-sectional view illustrating a first engagement protrusion, taken along the line A1-A1 of FIG. 5.
Figure 8B:
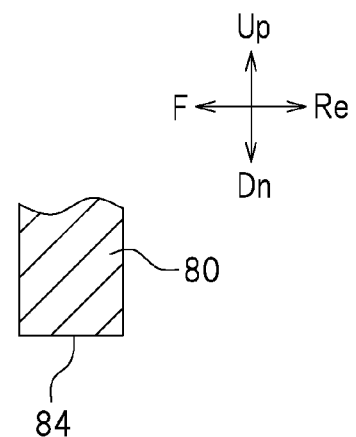
FIG. 8B is a cross-sectional view illustrating the first engagement protrusion, taken along the line A2-A2 of FIG. 5.

The first engagement protrusion 80 preferably includes a first contact portion 84 that comes into contact with a second engagement protrusion 92. The first contact portion 84 comes into contact with a second contact portion 94 of the second engagement protrusion 92 which will be described below. As illustrated in FIG. 8A, an outline of a cross-section of the first contact portion 84 which is parallel or substantially parallel to an axial direction of the operation shaft 90 (see FIG. 5) preferably has a linear shape. As illustrated in FIG. 8B, an outline of a cross-section of the first contact portion 84 which is perpendicular or substantially perpendicular to the axial direction of the operation shaft 90 preferably has a linear shape. Alternatively, the first contact portion 84 may have a semi-spherical shape, for example.

Figure 9A:
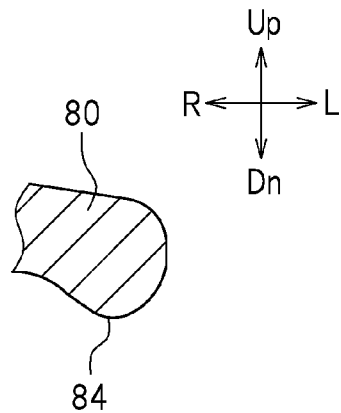
FIG. 9A is a cross-sectional view that illustrates a first engagement protrusion according to a variation of a preferred embodiment of the present invention and is equivalent to FIG. 8A.
Figure 9B:
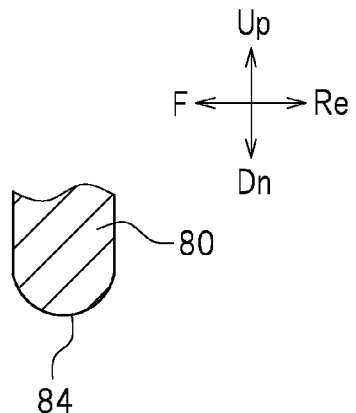
FIG. 9B is a cross-sectional view that illustrates the first engagement protrusion according to the variation of a preferred embodiment of the present invention and is equivalent to FIG. 8B.

Although the outline of the cross-section of the first contact portion 84 which is parallel or substantially parallel to the axial direction of the operation shaft 90 preferably has a linear shape and the outline of the cross-section of the first contact portion 84 which is perpendicular or substantially perpendicular to the axial direction of the operation shaft 90 preferably has a linear shape in the present preferred embodiment, the outlines of the cross-sections of the first contact portion 84 are not limited to such shapes. For example, as illustrated in FIG. 9A, the outline of the cross-section of the first contact portion 84 which is parallel or substantially parallel to the axial direction of the operation shaft 90 (see FIG. 5) may be in the shape of a segment of a circle. As illustrated in FIG. 9B, the outline of the cross-section of the first contact portion 84 which is perpendicular or substantially perpendicular to the axial direction of the operation shaft 90 may be in the shape of a segment of a circle. In another alternative, the outline of the cross-section of the first contact portion 84 which is parallel or substantially parallel to the axial direction of the operation shaft 90 may have a linear shape, and the outline of the cross-section of the first contact portion 84 which is perpendicular or substantially perpendicular to the axial direction of the operation shaft 90 may be in the shape of a segment of a circle. In still another alternative, the outline of the cross-section of the first contact portion 84 which is parallel or substantially parallel to the axial direction of the operation shaft 90 may be in the shape of a segment of a circle, for example, and the outline of the cross-section of the first contact portion 84 which is perpendicular or substantially perpendicular to the axial direction of the operation shaft 90 may have a linear shape, for example.

Figure 10:
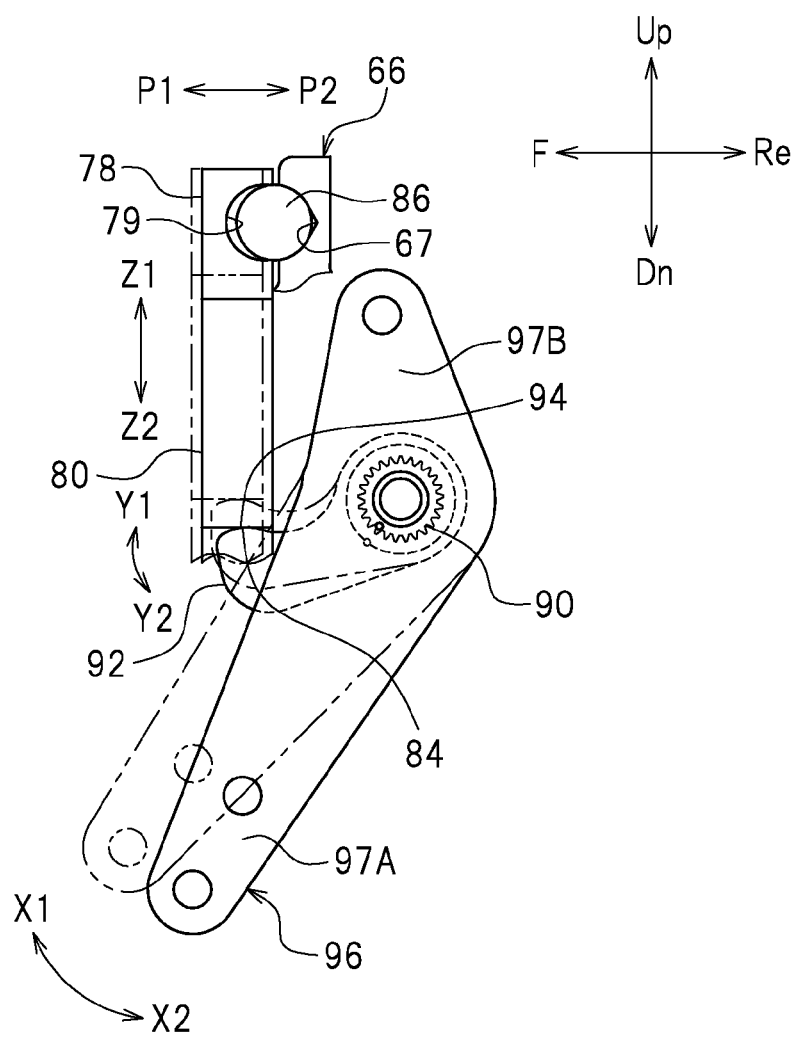
FIG. 10 is a side view illustrating a structure around an operation shaft according to a preferred embodiment of the present invention.
Figure 11:
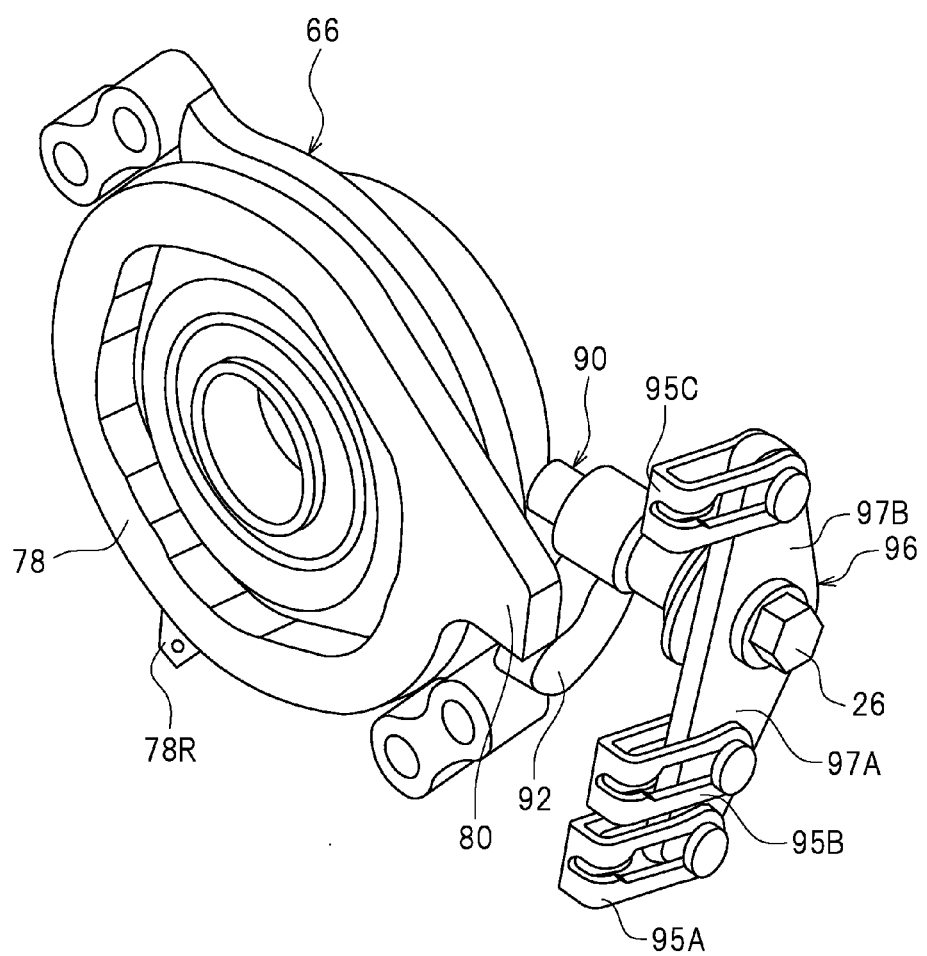
FIG. 11 is a perspective view illustrating the structure around the operation shaft according to a preferred embodiment of the present invention.

As illustrated in FIG. 5, the brake mechanism 60 preferably further includes the second engagement protrusion 92. The second engagement protrusion 92 engages with the first engagement protrusion 80. The second engagement protrusion 92 is disposed inside the housing 50. A front end 92F of the second engagement protrusion 92 is located frontward relative to a rear end 48AR of the first bearing 48A. As illustrated in FIG. 10, the second engagement protrusion 92 protrudes outward from the inner portion 91A (see FIG. 5) of the operation shaft 90 in a radial direction of the operation shaft 90. The second engagement protrusion 92 protrudes frontward from the operation shaft 90. As illustrated in FIG. 5, the second engagement protrusion 92 extends in a direction parallel or substantially parallel to the input shaft 42. As illustrated in FIG. 11, the second engagement protrusion 92 and the operation shaft 90 are preferably molded in one piece so as to define a single unitary member. Alternatively, the second engagement protrusion 92 and the operation shaft 90 may be separate components.

As illustrated in FIG. 10, the second engagement protrusion 92 preferably includes the second contact portion 94 that comes into contact with the first engagement protrusion 80.

Figure 12A:
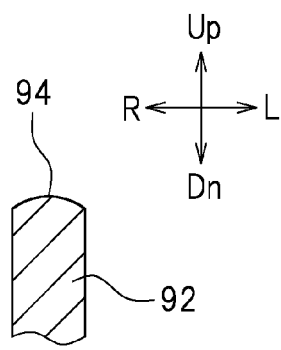
FIG. 12A is a cross-sectional view illustrating a second engagement protrusion, taken along the line A1-A1 of FIG. 5.
Figure 12B:
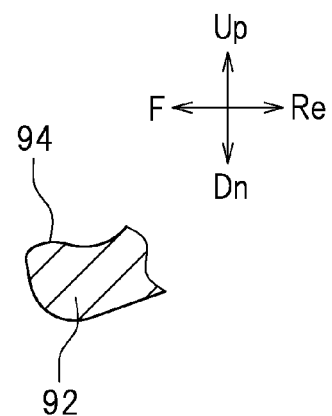
FIG. 12B is a cross-sectional view illustrating the second engagement protrusion, taken along the line A2-A2 of FIG. 5.

The second contact portion 94 comes into contact with the first contact portion 84 of the first engagement protrusion 80. As illustrated in FIG. 12A, an outline of a cross-section of the second contact portion 94 which is parallel or substantially parallel to the axial direction of the operation shaft 90 (see FIG. 5) is preferably in the shape of a segment of a circle. As illustrated in FIG. 12B, an outline of a cross-section of the second contact portion 94 which is perpendicular or substantially perpendicular to the axial direction of the operation shaft 90 (see FIG. 5) is preferably in the shape of a segment of a circle. Alternatively, the second contact portion 94 may have a semi-spherical shape, for example.

Figure 13A:
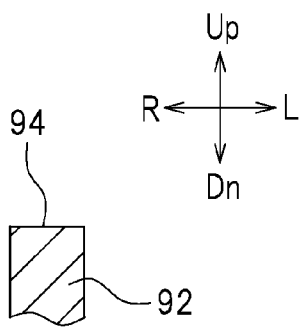
FIG. 13A is a cross-sectional view that illustrates a second engagement protrusion according to a variation of a preferred embodiment of the present invention and is equivalent to FIG. 12A.
Figure 13B:
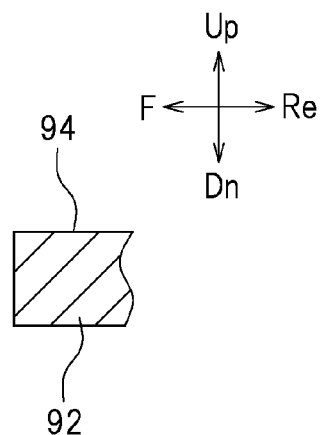
FIG. 13B is a cross-sectional view that illustrates the second engagement protrusion according to the variation of a preferred embodiment of the present invention and is equivalent to FIG. 12B.

Although the outline of the cross-section of the second contact portion 94 which is parallel or substantially parallel to the axial direction of the operation shaft 90 is preferably in the shape of a segment of a circle and the outline of the cross-section of the second contact portion 94 which is perpendicular or substantially perpendicular to the axial direction of the operation shaft 90 is preferably in the shape of a segment of a circle in the present preferred embodiment, the outlines of the cross-sections of the second contact portion 94 are not limited to such shapes. For example, as illustrated in FIG. 13A, the outline of the cross-section of the second contact portion 94 which is parallel or substantially parallel to the axial direction of the operation shaft 90 (see FIG. 5) may have a linear shape. As illustrated in FIG. 13B, the outline of the cross-section of the second contact portion 94 which is perpendicular or substantially perpendicular to the axial direction of the operation shaft 90 (see FIG. 5) may have a linear shape, for example. In another alternative, the outline of the cross-section of the second contact portion 94 which is parallel or substantially parallel to the axial direction of the operation shaft 90 may have a linear shape, for example, and the outline of the cross-section of the second contact portion 94 which is perpendicular or substantially perpendicular to the axial direction of the operation shaft 90 may be in the shape of a segment of a circle, for example. In still another alternative, the outline of the cross-section of the second contact portion 94 which is parallel or substantially parallel to the axial direction of the operation shaft 90 may be in the shape of a segment of a circle, for example, and the outline of the cross-section of the second contact portion 94 which is perpendicular or substantially perpendicular to the axial direction of the operation shaft 90 may have a linear shape, for example. The outline of the cross-section of at least either the first contact portion 84 or the second contact portion 94 which is parallel or substantially parallel to the axial direction of the operation shaft 90 may be in the shape of a segment of a circle, for example, and the outline of the cross-section of at least either the first contact portion 84 or the second contact portion 94 which is perpendicular or substantially perpendicular to the axial direction of the operation shaft 90 may be in the shape of a segment of a circle, for example.

Figure 14:
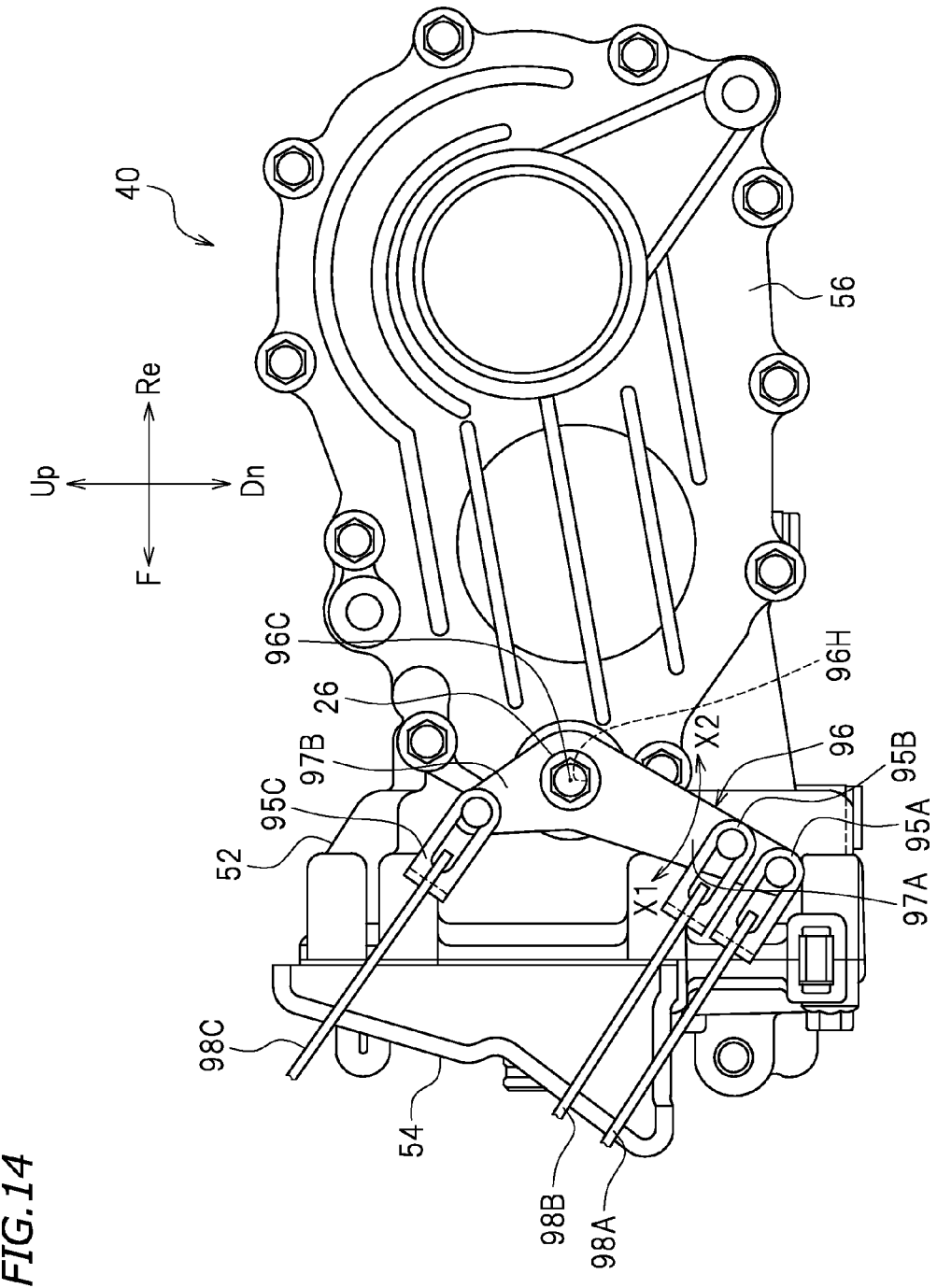
FIG. 14 is a left side view illustrating the axle driving apparatus according to a preferred embodiment of the present invention.

As illustrated in FIG. 5, the lever 96 is attached to the outer portion 91B of the operation shaft 90. The lever 96 is rotatable together with the operation shaft 90. The lever 96 is provided with an insertion hole 96H through which the outer portion 91B of the operation shaft 90 is inserted. The lever 96 is fixed to the operation shaft 90 with a bolt 26, for example. The structure configured to attach the lever 96 to the operation shaft 90 is not limited to any particular structure. As illustrated in FIG. 4, the lever 96 is disposed rightward relative to a left end 56L of the second housing cover 56. The lever 96 is disposed leftward relative to a right end 52R of the housing main body 52. The lever 96 is disposed leftward relative to a left end 54L of the first housing cover 54. The lever 96 is disposed leftward relative to the input shaft 42. The lever 96 is disposed frontward relative to the intermediate shaft 44. As illustrated in FIG. 14, the lever 96 preferably includes a first arm 97A and a second arm 97B which extend in two different directions at given angles with respect to a center 96C of the insertion hole 96H. The first arm 97A extends obliquely downward and frontward with respect to the center 96C of the insertion hole 96H. The second arm 97B extends obliquely upward and frontward with respect to the center 96C of the insertion hole 96H. The first arm 97A is provided with a first cable holder 95A to which the operation cable 98A connected to the brake lever 62A (see FIG. 1) is to be attached, and a second cable holder 95B to which the operation cable 98B connected to the brake pedal 62B (see FIG. 1) is to be attached. The second arm 97B is provided with a third cable holder 95C to which a control cable 98C is to be attached. Since the straddle-type vehicle 1 includes the control cable 98C, a gear shift from forward to reverse or a gear shift from reverse to forward is enabled only when rotation of the input shaft 42 (see FIG. 4) is braked by the brake mechanism 60 (see FIG. 4).

As illustrated in FIG. 2, the operation cables 98A and 98B each extend frontward from the lever 96. As illustrated in FIG. 1, the operation cables 98A and 98B each extend obliquely upward and frontward from the lever 96. At least a portion of the operation cable 98A is disposed downward relative to the operation cable 98B.

Next, how the brake mechanism 60 operates will be described. When the brake lever 62A or the brake pedal 62B is operated by the rider, the operation cable 98A or the operation cable 98B is pulled toward the front of the vehicle. Thus, the lever 96 connected to the operation cables 98A and 98B moves in a direction indicated by an arrow X1 in FIG. 14. The operation shaft 90 rotates together with the lever 96. Therefore, with the movement of the lever 96, the second engagement protrusion 92 that protrudes frontward from the operation shaft 90 moves in a direction indicated by an arrow Y1 in FIG. 10. The second contact portion 94 of the second engagement protrusion 92 and the first contact portion 84 of the first engagement protrusion 80 are in contact with each other. Therefore, with the movement of the second engagement protrusion 92, the first engagement protrusion 80 and the cam plate 78 move in a direction indicated by an arrow Z1 in FIG. 10. With the movement of the cam plate 78, each cam ball 86 comes into contact with the inclined surface 79A (see FIG. 7) of the associated cam groove 79. Hence, a force is applied to the cam plate 78 from each cam ball 86 in a direction indicated by an arrow P1 in FIG. 10. The cam plate 78 moves in the direction indicated by the arrow P1 in FIGS. 5 and 10. Upon movement of the cam plate 78 in the direction indicated by the arrow P1 in FIG. 5, the fixed plates 74 and the rotation plates 72 come into contact with each other, thus braking rotation of the rotation plates 72 and rotation of the input shaft 42 that rotates together with the rotation plates 72. As a result, rotation of the axle 22 is braked.

When the operation performed on the brake lever 62A or the brake pedal 62B is stopped by the rider, the lever 96 moves in a direction indicated by an arrow X2 in FIG. 14. With this movement of the lever 96, the second engagement protrusion 92 moves in a direction indicated by an arrow Y2 in FIG. 10. With this movement of the second engagement protrusion 92, the first engagement protrusion 80 and the cam plate 78 move in a direction indicated by an arrow Z2 in FIG. 10. With this movement of the cam plate 78, each cam ball 86 fits into the recessed portion 79B (see FIG. 7) of the associated cam groove 79. Thus, the force applied to the cam plate 78 from each cam ball 86 is lost. In this case, the coil spring provided at the cam plate 78 urges the cam plate 78 to move in a direction indicated by an arrow P2 in FIG. 10. Thus, the fixed plate 74B and the rotation plate 72 adjacent thereto are brought out of contact with each other, so that the input shaft 42 starts to rotate. As a result, the axle 22 starts to rotate.

As illustrated in FIG. 4, in the straddle-type vehicle 1, the operation shaft 90 extends in the direction perpendicular or substantially perpendicular to the axial direction of the input shaft 42 which extends in the vehicle front-rear direction as described above. Therefore, the lever 96 attached to the outer portion 91B of the operation shaft 90 rotates around an axis perpendicular or substantially perpendicular to the axial direction of the input shaft 42. Thus, the operation cable 98A connected to the brake lever 62A and the lever 96, and the operation cable 98B connected to the brake pedal 62B and the lever 96 are each extended in a direction parallel or substantially parallel to the axial direction of the input shaft 42. In other words, the operation cables 98A and 98B are extended from the lever 96 in the vehicle front-rear direction. Hence, the operation cables 98A and 98B do not have to be bent by 90 degrees when the brake lever 62A and the lever 96 are connected to each other through the operation cable 98A and the brake pedal 62B and the lever 96 are connected to each other through the operation cable 98B. As a result, power transmission losses in the operation cables 98A and 98B are significantly reduced or prevented, thus efficiently transmitting operations performed on the brake lever 62A and the brake pedal 62B.

In the straddle-type vehicle 1 according to the present preferred embodiment, the brake lever 62A and the brake pedal 62B are disposed frontward relative to the housing 50. The operation cables 98A and 98B extend frontward from the lever 96. Therefore, the operation cables 98A and 98B do not have to be bent by 90 degrees when the brake lever 62A and the operation cable 98A are connected to each other and the brake pedal 62B and the operation cable 98B are connected to each other. As a result, power transmission losses in the operation cables 98A and 98B are significantly reduced or prevented, thus efficiently transmitting operations performed on the brake lever 62A and the brake pedal 62B.

As illustrated in FIGS. 8A and 8B, in the straddle-type vehicle 1 according to the present preferred embodiment, the outline of the cross-section of the first contact portion 84 which is parallel or substantially parallel to the axial direction of the operation shaft 90 has a linear shape, and the outline of the cross-section of the first contact portion 84 which is perpendicular or substantially perpendicular to the axial direction of the operation shaft 90 has a linear shape. As illustrated in FIGS. 12A and 12B, the outline of the cross-section of the second contact portion 94 which is parallel or substantially parallel to the axial direction of the operation shaft 90 is in the shape of a segment of a circle, and the outline of the cross-section of the second contact portion 94 which is perpendicular or substantially perpendicular to the axial direction of the operation shaft 90 is in the shape of a segment of a circle. Thus, when the operation shaft 90 is rotated by operating the brake lever 62A and the brake pedal 62B, the first and second engagement protrusions 80 and 92 are brought into contact with each other more reliably. As a result, operations performed on the brake lever 62A and the brake pedal 62B are reliably transmitted to the plate group 70. Furthermore, wearing away of the first and second engagement protrusions 80 and 92 which is caused by contact therebetween is significantly reduced or prevented.

Assume that the outline of the cross-section of the first contact portion 84 which is parallel or substantially parallel to the axial direction of the operation shaft 90 has a linear shape, the outline of the cross-section of the first contact portion 84 which is perpendicular or substantially perpendicular to the axial direction of the operation shaft 90 has a linear shape, the outline of the cross-section of the second contact portion 94 which is parallel or substantially parallel to the axial direction of the operation shaft 90 has a linear shape, and the outline of the cross-section of the second contact portion 94 which is perpendicular or substantially perpendicular to the axial direction of the operation shaft 90 has a linear shape. In that case, an edge of the second contact portion 94 which is located inward in a vehicle width direction and located forward in the vehicle front-rear direction always comes into contact with the first contact portion 84 during rotation of the operation shaft 90. Hence, wearing away of the edge of the second contact portion 94 might be hastened. As a result, an operation performed on the brake operator might not be efficiently transmitted to the plate group 70. However, when the outline of the cross-section of at least either the first contact portion 84 or the second contact portion 94 which is parallel or substantially parallel to the axial direction of the operation shaft 90 and/or the outline of the cross-section of at least either the first contact portion 84 or the second contact portion 94 which is perpendicular or substantially perpendicular to the axial direction of the operation shaft 90 are/is in the shape of a segment of a circle, a contact point between the first and second contact portions 84 and 94 varies depending on a rotational position of the operation shaft 90. Thus, wearing away of the first and second contact portions 84 and 94 is reduced. Preferably, the outline of the cross-section of the first contact portion 84 which is parallel or substantially parallel to the axial direction of the operation shaft 90 is in the shape of a segment of a circle, the outline of the cross-section of the first contact portion 84 which is perpendicular or substantially perpendicular to the axial direction of the operation shaft 90 is in the shape of a segment of a circle, the outline of the cross-section of the second contact portion 94 which is parallel or substantially parallel to the axial direction of the operation shaft 90 is in the shape of a segment of a circle, and the outline of the cross-section of the second contact portion 94 which is perpendicular or substantially perpendicular to the axial direction of the operation shaft 90 is in the shape of a segment of a circle.

As illustrated in FIG. 4, in the straddle-type vehicle 1 according to the present preferred embodiment, the lever 96 is disposed rightward relative to the left end 56L of the second housing cover 56 and leftward relative to the right end 52R of the housing main body 52. Thus, the lever 96 does not protrude outward of the housing 50 in the vehicle width direction. As a result, compactness of the housing 50, in which the lever 96 is included, in the vehicle width direction is ensured.

As illustrated in FIG. 4, in the straddle-type vehicle 1 according to the present preferred embodiment, the operation shaft 90 is rotatably supported by the housing main body 52 and the second housing cover 56. Therefore, the end portions of the operation shaft 90 are supported by the housing main body 52 and the second housing cover 56. As a result, the operation shaft 90 is stably supported, thus efficiently transmitting operations performed on the brake lever 62A and the brake pedal 62B.

As illustrated in FIG. 4, in the straddle-type vehicle 1 according to the present preferred embodiment, the cam plate 78 is disposed rearward relative to the plate group 70. As a result, the end portions of the operation shaft 90 are supported with a simple structure.

As illustrated in FIG. 4, in the straddle-type vehicle 1 according to the present preferred embodiment, the second engagement protrusion 92 protrudes frontward from the operation shaft 90. Thus, the first and second engagement protrusions 80 and 92 are disposed close to the plate group 70. Therefore, oil scattered from the plate group 70 is easily supplied to the first and second engagement protrusions 80 and 92. As a result, the first and second engagement protrusions 80 and 92 are lubricated.

As illustrated in FIG. 5, in the straddle-type vehicle 1 according to the present preferred embodiment, the front end 92F of the second engagement protrusion 92 is located frontward relative to the rear end 48AR of the first bearing 48A. The rear end 90T of the operation shaft 90 is located rearward relative to the front end 48BF of the second bearing 48B. Thus, the operation shaft 90 and the second engagement protrusion 92 are disposed in a space located laterally of the first and second bearings 48A and 48B. As a result, the space inside the housing 50 is effectively utilized, so that the operation shaft 90 and the second engagement protrusion 92 are compactly disposed.

As illustrated in FIG. 4, in the straddle-type vehicle 1 according to the present preferred embodiment, the laterally intermediate portion 46C of the output shaft 46 is located leftward of the shaft center H1 of the input shaft 42, and the operation shaft 90 is located leftward of the shaft center H1 of the input shaft 42. As a result, a size of the housing 50 in the vehicle width direction is smaller than when the operation shaft 90 is disposed rightward of the shaft center H1 of the input shaft 42.

As illustrated in FIG. 4, in the straddle-type vehicle 1 according to the present preferred embodiment, the left end 90L of the operation shaft 90 is located leftward relative to the right end 44R of the intermediate shaft 44 and leftward relative to the right end 46R of the output shaft 46. The right end 90R of the operation shaft 90 is located rightward relative to the left end 44L of the intermediate shaft 44 and rightward relative to the left end 46L of the output shaft 46. Thus, the operation shaft 90, the output shaft 46 and the intermediate shaft 44 are disposed so as to overlap with each other along the vehicle right-left direction. As a result, the size of the housing 50 in the vehicle width direction is smaller than when the operation shaft 90, the output shaft 46 and the intermediate shaft 44 are disposed at positions deviated from each other in the vehicle right-left direction.

As illustrated in FIG. 4, in the straddle-type vehicle 1 according to the present preferred embodiment, the left end 44L of the intermediate shaft 44 is located rightward relative to the left end 90L of the operation shaft 90. The right end 44R of the intermediate shaft 44 is located leftward relative to the shaft center H1 of the input shaft 42. Thus, the intermediate shaft 44 is disposed inside the housing 50 compactly in the vehicle width direction. As a result, compactness of the housing 50, in which the intermediate shaft 44 is included, in the vehicle width direction is ensured.

Although the operation shaft 90 and the lever 96 are located leftward of the shaft center H1 of the input shaft 42 in the above-described preferred embodiments, the operation shaft 90 and the lever 96 may be located rightward of the shaft center H1 of the input shaft 42. In such a case, the intermediate shaft 44 is located rightward of the shaft center H1 of the input shaft 42, and the laterally intermediate portion 46C of the output shaft 46 is located rightward of the shaft center H1 of the input shaft 42.

In the above-described preferred embodiments, the wall portion 54A of the first housing cover 54, the plate group 70, the cam plate 78 and the cam member 66 are disposed in this order from the front of the vehicle. However, the order in which these components are disposed is not limited to the order mentioned above. For example, the cam member 66, the cam plate 78, the plate group 70 and a wall portion of the housing main body 52 may be disposed in this order from the front of the vehicle. In that case, the wall portion of the housing main body 52 is a wall portion that faces frontward.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   a power unit;
   a drive shaft connected to the power unit and extending in a front-rear direction of the vehicle, the drive shaft being configured to rotate by receiving a driving force from the power unit;
   an input shaft connected to the drive shaft and extending in the vehicle front-rear direction;
   a housing including a wall portion facing rearward or frontward and in which at least a portion of the input shaft is housed;
   an output shaft connected to an axle and extending in a right-left direction of the vehicle, the output shaft being configured to rotate by receiving a driving force from the input shaft;
   a brake operator configured to have an operation performed thereon to brake the input shaft;
   a cam member disposed inside the housing and spaced away from the wall portion of the housing in the vehicle front-rear direction;
   a plate group disposed between the wall portion of the housing and the cam member, the plate group including annular rotation plates attached to the input shaft so as to be rotated together with the input shaft, and annular fixed plates each disposed between an adjacent one of the rotation plates and the cam member and/or between an adjacent one of the rotation plates and the wall portion of the housing; and
   an annular cam plate disposed between the cam member and the plate group; wherein
   the cam member and/or the cam plate are/is provided with a cam groove including an inclined surface;
   the straddle-type vehicle further comprises:
      a cam ball located between the cam member and the cam plate and disposed inside the cam groove;
      a rotatable operation shaft passing through the housing and extending in a direction perpendicular or substantially perpendicular to an axial direction of the input shaft, the operation shaft including an inner portion located inside the housing and an outer portion located outside the housing;
      a first engagement protrusion disposed inside the housing and protruding outward from the cam plate in a radial direction of the cam plate;
      a second engagement protrusion protruding outward from the inner portion of the operation shaft in a radial direction of the operation shaft, and engaging with the first engagement protrusion;
      a lever attached to the outer portion of the operation shaft and rotatable together with the operation shaft; and
      an operation cable connected to the brake operator and the lever.

2. The straddle-type vehicle according to claim 1, wherein the brake operator is disposed frontward relative to the housing, and the operation cable extends frontward from the lever.

3. The straddle-type vehicle according to claim 1, wherein the first engagement protrusion includes a first contact portion configured to come into contact with the second engagement protrusion;
   the second engagement protrusion includes a second contact portion configured to come into contact with the first contact portion of the first engagement protrusion;
   an outline of a cross-section of at least either the first contact portion or the second contact portion which is parallel or substantially parallel to an axial direction of the operation shaft is in a shape of a segment of a circle; and
   an outline of a cross-section of at least either the first contact portion or the second contact portion which is perpendicular or substantially perpendicular to the axial direction of the operation shaft is in a shape of a segment of a circle.

4. The straddle-type vehicle according to claim 1, wherein the first engagement protrusion includes a first contact portion configured to come into contact with the second engagement protrusion;
   the second engagement protrusion includes a second contact portion configured to come into contact with the first contact portion of the first engagement protrusion;
   an outline of a cross-section of the first contact portion which is parallel or substantially parallel to an axial direction of the operation shaft has a linear shape, and an outline of a cross-section of the first contact portion which is perpendicular or substantially perpendicular to the axial direction of the operation shaft has a linear shape;
   an outline of a cross-section of the second contact portion which is parallel or substantially parallel to the axial direction of the operation shaft is in a shape of a segment of a circle; and
   an outline of a cross-section of the second contact portion which is perpendicular or substantially perpendicular to the axial direction of the operation shaft is in the shape of a segment of a circle.

5. The straddle-type vehicle according to claim 1, wherein the lever is disposed rightward relative to a left end of the housing and leftward relative to a right end of the housing.

6. The straddle-type vehicle according to claim 1, wherein the housing includes a housing main body supporting the input shaft, and a housing cover attached to the housing main body, wherein the operation shaft is rotatably supported by the housing main body and the housing cover.

7. The straddle-type vehicle according to claim 1, wherein the cam plate is disposed rearward relative to the plate group.

8. The straddle-type vehicle according to claim 7, wherein the second engagement protrusion protrudes frontward from the operation shaft.

9. The straddle-type vehicle according to claim 8, further comprising:
- a first bearing rotatably supporting the input shaft; and
- a second bearing disposed behind the first bearing and rotatably supporting the input shaft; wherein
- a front end of the second engagement protrusion is located frontward relative to a rear end of the first bearing; and
- a rear end of the operation shaft is located rearward relative to a front end of the second bearing.

10. The straddle-type vehicle according to claim 1, wherein, when either one of a right end and a left end of the housing is defined as a first end and the other one of the right end and the left end of the housing is defined as a second end, a laterally intermediate portion of the output shaft is located closer to the first end than a shaft center of the input shaft, and the operation shaft is located closer to the first end than the shaft center of the input shaft.

11. The straddle-type vehicle according to claim 1, further comprising:
- an intermediate shaft disposed rearward relative to the input shaft and frontward relative to the output shaft, the intermediate shaft extending in the vehicle right-left direction and connected to the input shaft and to the output shaft; wherein
- a left end of the operation shaft is located leftward relative to a right end of the intermediate shaft and leftward relative to a right end of the output shaft; and
- a right end of the operation shaft is located rightward relative to a left end of the intermediate shaft and rightward relative to a left end of the output shaft.

12. The straddle-type vehicle according to claim 11, wherein the left end of the intermediate shaft is located rightward relative to the left end of the operation shaft, and the right end of the intermediate shaft is located leftward relative to the shaft center of the input shaft.

* * * * *